UNITED STATES PATENT OFFICE 2,239,358

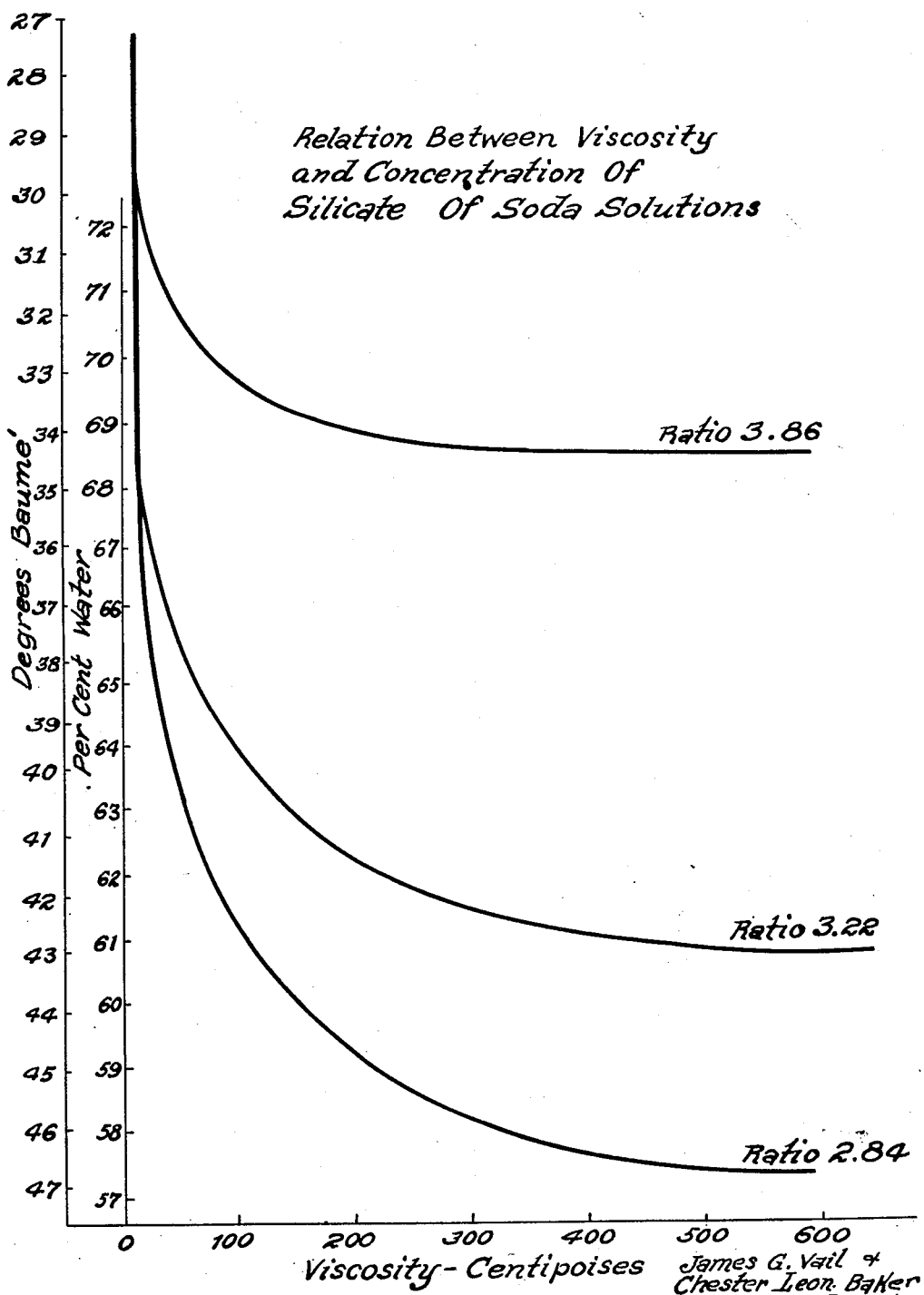

MANUFACTURE OF ADHESIVES FOR THE MACHINE FABRICATION OF LAMINATED PAPER PRODUCTS

James G. Vail, Media, and Chester Leon Baker, Penn Wynne, Pa., assignors to Philadelphia Quartz Company, Philadelphia, Pa., a corporation of Pennsylvania Application March 16, 1938, Serial No. 196,264

15 Claims. (Cl. 134—23.92)

This invention relates to manufacture of adhesives for the machine fabrication of laminated paper products; and it relates to adhesives particularly adapted for use in the high-speed, continuous pasting machines used in the manufacture of laminated paper products, such as solid fibre container board, corrugated paper board, combined paper board, wall board and similar products. The process of this invention comprises mixing a fine-grained clay with water and with an alkali metal silicate having a percentage ratio of $SiO_2$ to alkali metal oxide advantageously ranging from about 2.5 to 4.0, in such manner and proportions as to produce a substantially stable suspension having an aqueous phase with a viscosity falling on the low-viscosity portion of the "knee" of its viscosity-specific gravity curve and having a filter test not exceeding about 15 cc. In an advantageous modification of this process the clay is deflocculated with the use of a peptizing agent prior to contacting it with flocculating concentrations of the alkali metal silicate, this enabling the use of an amount of clay not substantially exceeding about 20 per cent by weight, and the suspension is stabilized by a heat treatment, the proportions, properties and method of compounding the various ingredients of the suspension being so chosen as to produce a finished adhesive having a viscosity particularly adapted to the particular operation and machine which are being employed. The adhesives of this invention are substantially stable suspensions of highly dispersed clay in an aqueous vehicle comprising the solution of an alkali metal silicate having a percentage ratio of $SiO_2$ to alkali metal oxide ranging from about 2.5 to 4.0 and having a viscosity falling on the low-viscosity portion of the "knee" of its viscosity-specific gravity curve; the adhesive as a whole having a filter test of not substantially exceeding 15 cc., advantageously containing not substantially more than 20 per cent by weight of clay and having a viscosity particularly adapted to the operation in which said adhesive is employed; all as more fully hereinafter set forth and as claimed.

This application is a continuation-in-part of our prior copending applications Serial Nos. 61,632 and 61,633 filed on January 30, 1936 (now Patents Nos. 2,133,579 and 2,205,609). Our prior applications are directed to the manufacture of suspensions in general by the use of alkali metal silicates, while the present application is specifically directed to the manufacture of adhesives of the particular type used in the machine fabrication of laminated paper products.

Silicate of soda adhesives have been used for at least 25 years in the fabrication of laminated paper products. In recent years this type of adhesive has become almost universally used for this purpose owing to its cheapness and to the strong, vermin-proof bond produced. Straight sodium silicate solutions used for this purpose have had the characteristic of increasing enormously in viscosity upon the evaporation of only about 2 per cent of their water content and having viscosities considerably higher than those employed in the present invention, for silicates of the same silica ratio.

One of the early improvements in silicate adhesives used in manufacturing laminated paper products is described in the U. S. Patent No. 1,188,040 to John D. Carter, who proposes to employ as an adhesive a silicate solution having a gravity of 34° Baumé containing about 80 per cent of its weight of hydrous clay in suspension therein. The advantages obtained in the use of clay in this manner, as stated in the Carter patent, are that the adhesive is slow drying and has only a slight tendency to penetrate into the paper stock, thereby enabling the use of a small quantity of adhesive. The U. S. Patent No. 1,377,739 to Thickens describes a similar adhesive in which large amounts of clay are used and which is said to set more slowly than the ordinary silicate solutions previously used in the wall board art. It is thus seen that these prior inventors employed clay in their adhesives primarily to produce a delayed time of set.

The silicate adhesives of Carter and of Thickens are suitable for use only on machines which are operated at low speeds, such as the sheet paster type of machine, for example. In this machine cut sheets of paper stock are passed through the machine by hand, the silicate adhesive usually being applied to both sides, after which facing sheets are superimposed prior to the pressing operation. In the use of this sheet paster type of machine it is necessary that the adhesives employed have a slow set in order to provide sufficient time for the placing of the facing sheets and to enable the pressing step to be conducted before the adhesive has fully set. But the modern, high-speed, continuous pasting machines all require more rapidly setting adhesives, at least when operated at usual speeds. In these high-speed machines continuous sheets of stock are passed through a machine which applies adhesive to one or more plies, then combines the stock and finally presses the board, all in one continuous operation. The adhesives described by Carter and by Thickens are much too viscous and too slow setting for high-speed operations.

The requirements which must be met by adhesives used in the modern continuous pasting machines, in the making of combined and corrugated paper board, for example, are very strict. Such adhesives should have a low specific gravity in order that the finished board may have a maximum strength per unit of weight. For satisfactory performance these adhesives must not penetrate the board substantially since this results in additional expense for material, increased brittleness of the board and danger of stain. It is also important that these adhesives possess thixotropic characteristics which serve to hold them at the point to which they are applied. Furthermore these adhesives must have a relatively low viscosity in order to enable them to be spread quickly; they should not settle out suspended matter and their wetting power must be high. But probably the most important characteristic required in such adhesives is a short time of set to enable a satisfactory rate of production of the paper board in the continuous type of pasting machine.

The above requirements of adhesives have greatly increased in strictness during the past few years. This has been largely due to the fact that mechanical improvements in the high-speed continuous pasting machines have outstripped the advances made in the adhesive field. At the present time the speeds, of which these machines are capable, are limited, not by the mechanics of the pasting operation, but by the speed of setting of the adhesives used in these machines. This has greatly increased the demand for quickly setting adhesives.

Another factor which has increased the requirements of adhesives in this art is the improvements which have been made in the paper stock used in making laminated paper products. There has been a distinct tendency to the use of water resistant paper stock which is usually heavily sized with rosin or other water repellant materials. This type of paper stock requires the use of adhesives having a high wetting power. It has been found that the straight concentrated solutions of sodium silicate possess a lower wetting power than is frequently desired in adhesives used on the high-speed continuous pasting machines, especially when operating with water repellant paper stock. Attempts have been made to overcome this difficulty by the addition of wetting agents to silicate adhesives but this has not proved successful. The wetting power of straight silicate solutions can be increased by dilution with water but, if diluted to the point at which they possess satisfactory wetting power, they penetrate the paper stock so rapidly that insufficient material is left between the plies to produce adherence. Moreover these diluted solutions set too slowly and have a tendency to spread rapidly over any surface to which they are applied. These diluted silicate solutions like the concentrated ones are lacking in thixotropic character.

In the manufacture of corrugated products still further complications arise. It is well known that maximum strength is obtained when the corrugated sheet follows a carefully worked out truss design with regular spacing of the corrugations and secure adhesion of their tips to the facing sheets. To obtain this end it is necessary that the adhesive wet both surfaces and set to a solid while the tips of the corrugations are, for a small fraction of a second, held in proper position against the liner sheet. If this does not occur, the finished board is weak because of poor adhesion or because the paper trusses or corrugations become subsequently adhered in a distorted manner or in the wrong position. If the adhesive penetrates the corrugated sheet unduly, distortion is increased owing to the resultant warping of the moistened sheet. And if the adhesive is not sufficiently thixotropic it spreads to a wide strip causing a waste of adhesive and an inferior product.

The present invention provides what we believe to be a satisfactory solution for the problem outlined above. During the course of our investigations, we found that the wetting powers of silicate solutions, for a given ratio of $Na_2O$ to $SiO_2$, varies roughly inversely with the viscosities of the solutions, that is, the lower the viscosity, the higher the wetting power. The relationships existing between the water contents, viscosities and specific gravities of silicate solutions are illustrated graphically in the accompanying drawing which shows these relationships for silicate solutions having three ratios of % $SiO_2$ to % $Na_2O$, namely 2.84, 3.22 and 3.86, these ratios being indicated on the respective curves. In this drawing, the gravities in degrees Baumé are plotted as ordinates against the viscosities expressed in centipoises, as abscissas. The percent of water in these solutions is also shown along the vertical axis. It is evident from this drawing that, for compositions along the substantially horizontal sections, of the curves, the voscosities decrease very rapidly with a slight addition of water and consequently the wetting powers of these solutions can be increased proportionally by the addition of water. On the other hand, for compositions falling along the substantially vertical (low-viscosity) legs of the curves, both the viscosity and the wetting power change relatively slowly upon change in water content. For example, it is evident, by referring to the curve representing the percentage ratio of $SiO_2$ to $Na_2O$ of 3.22, that, for compositions on this curve having a gravity below about 35° Bé., but little improvement in wetting power results upon the addition of water. The commercial silicate solutions of the same ratio which are now used as adhesives, having gravities of from 41 to 42.5° Bé. fall along the "knee" of this curve. These solutions, therefore, upon the addition of water, show intermediate but substantial changes in their viscosities and wetting powers. But, as stated previously, when water is added to these solutions they penetrate paper stock too rapidly to be employed on the continuous paster type of machine. This is true even when these solutions are diluted only to 39° Bé. It is readily apparent from the drawing that similar relationships hold for silicate solutions of other ratios of % $SiO_2$ to % $Na_2O$. We have also found that similar relationships hold for other alkali metal silicate solutions, such as potassium silicate, for example.

We have found that the addition of a small amount of clay, usually not exceeding 20 per cent by weight, based on the weight of the mixture, decreases the penetration of silicate solutions and increases their thixotropic characteristics to such an extent that more dilute solutions can be employed without undesired penetration of the paper stock. We have found that the relationships between viscosities, water contents and gravities, which have been discussed above in connection with the drawing, apply also to the aqueous phase of our adhesives, that is, the clay added in accordance with our invention does not appreciably alter these relationships as applied to the aqueous phase of the adhesives. These new adhesives set with extreme rapidity. Since it is possible, by the use of the present invention, to keep the amount of clay in our adhesives below about 20 per cent by weight, it is evident that the increase of specific gravity caused by the clay present can be made substantially negligible. The viscosities of the resulting adhesives can be adjusted within proper limits by properly choosing the clay, by control of the amount of clay added and by varying the concentration of the silicate. And we have found that, if the clay is thoroughly deflocculated in aqueous suspension prior to the introduction of the silicate, in accordance with the preferred modification of this invention, a substantial increase in stability is obtained. By means of this invention adhesives can be readily produced which are substantially stable, separating not more than about 50 per cent of clear supernatant liquor upon 24 hours standing, a stability well within the limits required in an adhesive used on the continuous pasting machines.

Our new adhesives are characterized by their extremely rapid rate of setting which is of great advantage in the manufacture of laminated paper products not only because this permits an increased production from a given laminating machine but also because this enables the combining of the stock in an accurately predetermined manner and in the exact relationship which careful design has found to produce maximum mechanical strength in the final product. With the adhesives now in use, which often permit distortion or displacement of the carefully formed corrugated sheet before final set is attained, the maximum strength, as dictated by optimum strut design, is not attained and the finished board is mechanically weaker than it might otherwise be.

The thixotropic character and low penetration of our new adhesives enable an important reduction of the quantity of adhesive required in the manufacture of laminated paper products without the sacrifice of mechanical strength. This represents an appreciable economy and, what is equally important, enables a reduction in the weight of the laminated product.

Our new adhesives have the further advantage that they can be used over a considerably greater range of operating conditions than the prior art adhesives. With the straight silicate adhesives, for example, satisfactory operation depends to a considerable extent upon the water content and the type of paper to which they are applied. If the paper is too dry they do not wet the paper satisfactorily. But if the paper contains too much moisture these adhesives wet the paper too easily, soaking into the paper and thus forming a poor bond. Our adhesives are less sensitive to varying moisture content in the paper so that machine speeds are more uniformly maintained. The clay content of our adhesives prevents the adhesive from penetrating unduly even though the paper has a high moisture content. We have found that continuous pasting machines can be operated with our adhesives at speeds considerably above those which have been practicable with prior art adhesives.

The amount of clay employed in our adhesives ranges from about 1.5 per cent for a Wyoming bentonite to a maximum of about 20 per cent for clays of only slightly bentonitic or colloid character. It will be noted that this amount is from about ½ to 1/30 of the quantity used by Carter and by Thickens. And it is evident, from the preceding discussion, that this small addition of clay to a silicate solution favorably affects substantially all of the characteristics tending to produce an ideal adhesive for the continuous pasting machine.

It is possible to use a wide variety of clays in our adhesives, such as ball clays, China clays, bentonite, etc. We generally prefer, however, to use the kaolin type of clays which are found in South Carolina, for example, since these clays produce somewhat better adhesives as well as being cheaper and more readily available. For this type of clay the optimum quantity for best results ranges from about 6 to 12 per cent by weight based on the weight of the adhesive. The more colloidal the clay the less is required. But whatever type of clay is employed it should be preferably free from grit since the presence of any abrasive material in the adhesive tends to wear the machinery used in applying the adhesive.

We have found that satisfactory adhesives can be made for use on high-speed continuous pasting machines from sodium silicates having a ratio of % $SiO_2$ to % $Na_2O$ ranging from about 2.5 to 4. For most purposes best results are obtained with silicates whose ratio falls within the range of 3.2 to 3.4. Generally speaking, the higher the proportion of $SiO_2$ to $Na_2O$, the less the clay required in the adhesive.

The concentration of the silicate in the finished adhesive can be expressed best in terms of the specific gravity of the aqueous phase. This gravity may vary considerably, depending to some extent upon the silica ratio, that is, the ratio of $SiO_2$ to $Na_2O$ in the silicate. The optimum gravity, usually lies between the limits of about 30° to 48° Bé. and will be determined to a large extent by the silica ratio of the particular silicate chosen, as can be seen from the drawing. In order that the adhesives made from them should have a satisfactory wetting power and a short time of set, their compositions should fall on the low-viscosity portion of the "knee" of the viscosity-gravity curve shown in the drawing, the "knee" of the curve being defined as that portion of the curve showing a substantial curvature. With such solutions the viscosities increase enormously, that is, setting occurs upon the loss of a few per cent of water by evaporation, while the adhesives made from them have a sufficiently low viscosity and a sufficiently high wetting power to enable ready application in the machine. For silicates having ratios of 3.2:1 to 3.4:1, the optimum gravities range from about 37° to 41° Bé.

The concentration of the aqueous phase can also be chosen on the basis of its viscosity. In general it has been found that silicate of soda solutions which are of suitable concentration to form the aqueous phase of our adhesives will have a viscosity falling between 25 and 150 centipoises.

The viscosities of the finished adhesives made by our method must be rather closely controlled if these adhesives are to give the best operating results. The optimum viscosities range from about 50 to 500 centipoises, depending upon the type of paper used and even upon the particular machine which is used. For example, in the usual type of continuous corrugating machines, we have found that a viscosity lying between 140 and 180 centipoises produces best results. But in machines operating to produce solid paper board somewhat higher viscosities are required which usually fall within the range of 200 to 500 centipoises. The viscosities of our adhesives can be increased by increasing their clay content, by increased dispersion of the clay or by the use of an aqueous phase having a higher viscosity. Any of these factors can be varied to produce the desired viscosity in the finished adhesive.

In examining the mechanism of the action of the clay in our adhesives, in preventing penetration of the adhesive into the paper stock, we have found that this is due to the formation of a substantially impervious filter cake by the clay on the surface of the paper. Since a normal application of adhesive in the continuous pasting machines has a thickness of the order of 0.005 inch and since this film must form a substantially impervious filter cake, extending over both surfaces which are in contact with the paper stock and within a very short interval of time, it is evident that the conditions required for the formation of these filter cakes are highly critical. We have developed a simple test for determining whether or not a given adhesive possesses a sufficiently low penetration in order to operate satisfactorily on the continuous pasting machines.

If 40 cc. of an adhesive are placed upon a No. 40 Whatman filter paper in a 60° long-stem analytical funnel, a certain amount of clear silicate solution will filter through in 24 hours. The quantity filtered in this manner forms a rough test for the penetrating action of the adhesive. And we have found that, when this filter test ranges from about 4 to 15 cc., the adhesive is suitable for use in the continuous pasting machine, at least so far as its penetration is concerned. The best operating range is from about 6 to 12 cc. The filter test of an adhesive can be lowered to values within the desired range by the addition of a suitable clay.

In making adhesives within the present invention it is often desirable to thoroughly deflocculate the clay prior to mixing it with the bulk of the silicate. This enables the use of smaller quantities of clay in the adhesives. Deflocculation of the clay can be accomplished by methods which, per se, are well known in the art. It is merely necessary to mix the clay with water and with a suitable amount of a deflocculating agent, which may be an organic peptizing agent, such as tannic acid or gallic acid and their salts, quebracho, etc., or which may be an inorganic peptizing agent, such as sodium silicate, sodium carbonate, sodium hydroxide, sodium ortho or pyro phosphate and the like, these peptizing agents usually being employed in dilute solution. The important requirement is to produce substantially a minimum viscosity in the resulting deflocculated clay slip, a result which can be accomplished by the use of a sufficient quantity of a suitable peptizing or deflocculating agent.

We have found it particularly advantageous to employ dilute solutions of sodium silicate, ranging from about 0.1 to 5 per cent by weight, in deflocculating the clay. These solutions produce a high degree of deflocculation within a short time without introducing extraneous chemicals into the adhesive. Higher concentrations tend to produce flocculation of the clay but precipitation can be avoided by deflocculation of the clay prior to the addition of flocculating concentrations of the silicate. To accomplish this the sodium silicate is contacted with the clay in two stages. In the first stage sufficient silicate is added to produce a deflocculated clay slip and in the second stage sufficient additional silicate is incorporated to produce the desired adhesive.

When sodium silicate is employed as a deflocculating agent, deflocculation can be accomplished conveniently by the use of a soluble silicate glass or a solid water glass (hydrous silicate) obtained by partially drying a solution of silicate of soda. In making up our adhesives with solid silicates the clay may be admixed with the silicate either before or after the addition of water. Such solid silicates have such a rate of solution that, upon the addition of cold water, concentrations within the peptizing range are obtained for a time sufficient to completely deflocculate the clay before the concentration becomes sufficiently high to produce a flocculating effect. After the clay is deflocculated, the solution of the silicate can be speeded up, if desired, by heating the mixture. The use of solid silicates has the advantage that the adhesives of our invention can be made up as dry compositions for convenience in transportation and storage and then, when water is added in the correct proportions, the finished adhesive is produced.

When the clay to be used in making our adhesives is deflocculated in a separate step by contacting the same with a solution of a peptizing agent, the percentage of clay to be used in the resulting clay slip is determined largely by the method to be used for introducing the silicate of soda required in the finished adhesive. If the silicate of soda is to be introduced as a solid and then brought into solution, it is obvious, of course, that the clay slip can contain more water than in the case where the silicate is added in the form of a solution. For example the clay slip may in some cases contain as little at 12 per cent of clay when the silicate is added in solid form while it often must contain as much as 60 per cent of clay if the silicate is to be added in the form of a solution having a gravity of 41° Bé. The required proportions of water and clay can be readily calculated from the water content in the silicate to be added in making the finished adhesive.

The preparation of adhesives having the required filter test, together with a workable viscosity, wetting power, etc. requires a considerable degree of skill in the selection of a clay, in the method of mixing the clay with the silicate, in the control of the concentration of the silicate in the aqueous phase, etc., but it is believed that a study of the following specific examples, which represent practical operative embodiments of our adhesives, will provide sufficient information for those skilled in the art to produce adhesives falling within the purview of the present invention and useful in the high-speed continuous pasting type of laminating machine.

*Example 1*

In making up an adhesive by our method, we took 300 parts of a powdered hydrous silicate of soda containing approximately 19.4 per cent $Na_2O$, 62.5 per cent $SiO_2$ and 18 per cent water and mixed it thoroughly with 40 parts of finely ground California bentonite. This mixture was then stirred into 450 parts of water and allowed to stand for a few hours to effect solution of the silicate. The resulting suspension was found to be suitable for use as an adhesive in making up either corrugated or solid paper box board, for example, in the continuous pasting machine.

The suspension prepared in the above manner was found to have the following properties:

| | |
|---|---|
| Viscosity of aqueous phase_____centipoises__ | 25 |
| Viscosity of adhesive_____do____ | 155 |
| Gel strength of adhesive_____units__ | 107 |
| Filter test of adhesive_____cc.___ | 12 |
| Supernatant clear liquor after 24 hours settling_____ | None |

Example 2

In making up an adhesive from clay and sodium silicate solution, in accordance with our process, we took 10,000 parts of water and added 10 parts of a solution of silicate of soda containing 8.9 per cent $Na_2O$ and 28.6 per cent $SiO_2$. Then 15,000 parts of finely ground suprex clay (a high-grade plastic clay) were added and thoroughly mixed in. This mixture was paste-like in consistency. Next 59,985 parts of the same silicate of soda solution were added and mixed in. The clay dispersion appeared to coagulate at first but upon continued agitation was found to form a smooth homogeneous mixture that did not settle out or change in viscosity during storage. The physical properties of the resulting adhesive were found to be as follows:

| | |
|---|---|
| Viscosity of aqueous phase_____centipoises__ | 29 |
| Viscosity of adhesive_____do____ | 71 |
| Gel strength of adhesive_____units__ | 28 |
| Filter test of adhesive_____cc.___ | 8 |
| Supernatant liquor after 24 hours' standing_ | None |
| Specific gravity_____ | 1.41 |

The adhesive, as made above, contains about 17.5 per cent of clay in suspension.

Example 3

We introduced 400 pounds of water in a mixer. Into this we poured 5 pounds of silicate of soda solution testing 41° Bé. and having a ratio of % $SiO_2$ to % $Na_2O$ of 3.22 to 1. The resulting solution had a concentration producing a peptizing or deflocculating action upon the clay, 550 pounds of which were added and stirred in. This was a finely ground South Carolina China clay. Agitation was continued until all lumps had disappeared and a thin mass of creamy consistency was obtained. At this point 4,545 pounds of the same silicate solution were added slowly with agitation. During the addition of the silicate the mass thickened and became almost pasty, passing through a point of maximum viscosity and then becoming somewhat thinner. The finished adhesive was found to be smooth in consistency and to have a viscosity of about 140 centipoises and a filter test of 9 cc., its aqueous phase having a viscosity of 55 centipoises.

When the point of maximum viscosity is reached during the admixture of the silicate in this manner, it is important that the silicate should be added very slowly since otherwise the resulting adhesive will be curdy and unsuited for use.

Example 4

We introduced 5,770 pounds of water and 250 pounds of a concentrated sodium silicate solution into a mixer. The silicate solution had a gravity of 41° Bé. and a ratio of % $SiO_2$ to % $Na_2O$ of 3.22 to 1. 800 pounds of a South Carolina China clay were then thoroughly mixed in. When this mixture had become homogeneous it was run into a rotary atmospheric silicate dissolver, containing in excess of 3,160 pounds of silicate of soda glass having a ratio of % $SiO_2$ to % $Na_2O$ of 3.22:1. The resulting mixture was heated and agitated until a sample of the liquid tested about 39.5° Bé. while hot. The adhesive was then drawn off from the remaining silicate glass. Upon cooling it was found to have a viscosity of about 160 centipoises and was found suitable for use in the continuous paster type of machine for the fabrication of paper box board. The viscosity of its aqueous phase was found to be 72 centipoises.

Example 5

In making an adhesive for laminating paper products we used a silicate of soda testing 47.0° Bé. containing 10.9% $Na_2O$ and having a percentage ratio of $SiO_2$ to $Na_2O$ of 2.89. 236.1 pounds of this silicate were intimately mixed with 30.9 pounds of water, yielding a solution which tested 42.2° Bé. and which had a viscosity of 90 centipoises. To this solution we added 33 pounds of China clay while mixing. The resulting adhesive was smooth in consistency and separated less than 3.5% of its volume as a clear supernatant liquor in 24 hours. This adhesive had a filter test of 8.7 cc.; a viscosity of 157 centipoises and a specific gravity at 20° C. of 1,470. It was found to work very well in the machine fabrication of corrugated paper board.

Example 6

A commercial grade of silicate of soda was obtained which had a gravity of 33.6° Bé. contained 6.3% $Na_2O$ and had an $SoO_2$ to $Na_2O$ ratio of 3.892. 266.8 pounds of this silicate of soda were diluted with 7.7 pounds of water yielding a solution testing 32.7° Bé. and 91 centipoises viscosity. 25.5 pounds of China clay were then intimated mixed in. The resulting adhesive contained 8.5% clay, had a specific gravity at 20° C. of 1.337, a viscosity of 168 centipoises, a filter test of 5.3 cc. and it separated about 12% of its volume as a clear supernatant liquor upon standing quiescent for 24 hours. This adhesive worked very satisfactorily in the machine fabrication of corrugated paper board.

If desired, the adhesives produced in accordance with this invention can be improved somewhat by a short heat treatment. To accomplish this it is merely necessary to heat the adhesive to temperatures ranging from about 50° to 165° C. for a short time. This treatment stabilizes the adhesive to variations in temperature and brings about a partial solution of the more reactive portions of the clay. This results in a finished adhesive which is less likely to change in viscosity with time, particularly when subjected to higher temperatures. When this step is used it is usually possible to reduce the quantity of clay used in the adhesives. When a solid silicate is employed in making up our adhesives and when heating is used in bringing about a quick solution of the silicate, this produces the desired stabilization simultaneously.

While we have described what we consider to be the best embodiments of our adhesives and methods of making the same, it is evident, of course, that many modifications may be made in the specific procedures and compositions which have been disclosed without departing from the purview of the present invention. Thus, while most of the preceding description has been directed to the use of sodium silicate solutions, it is evident that the invention can be applied to other alkali metal silicates, all of which have viscosity-gravity curves similar in shape to those shown in the drawing. The more important factors, in compounding suitable adhesives, are first to employ an aqueous phase whose composition falls on the low-viscosity portion of the "knee" of the viscosity-gravity curve, second, to add sufficient clay to produce a filter test not substantially exceeding 15 cc. and third, to select the clay and composition of the aqueous phase in such manner as to produce the optimum viscosity in the finished adhesive. Several other factors are also of importance in the making of adhesives having optimum characteristics adapting them for special purposes; among these may be mentioned the preliminary deflocculation of the clay, and the heat treatment for stabilizing purposes. Relatively less important items are the type and quantity of the clay and the choice of any peptizing agent which is used.

In the making of the deflocculated clay slip, as described above, the order of admixture of the water, deflocculating agent and the clay is immaterial. But when this slip is mixed with additional silicate solution, it is best to add the silicate gradually to the clay slip rather than adding the slip to the silicate. If the latter procedure is followed the clay is likely to be precipitated by coming into contact with the concentrated silicate solution.

Certain changes in procedure are required in making our adhesives, when silicates are employed having different concentrations or different ratios of $SiO_2$ to $Na_2O$, for example. But these changes are believed to be obvious from the above description. The best or cheapest method to be used in a particular case will evidently depend largely upon the type of equipment available, the costs of raw materials and other considerations. Generally speaking it is a more simple procedure to use solutions of sodium silicate rather than solid silicates, although the latter procedure is generally less expensive if the necessary equipment is available. Further modifications of our invention, which fall within the scope of the following claims, will be immediately evident to those skilled in this art.

What we claim is:

1. In the manufacture of quick-setting adhesives particularly adapted for high-speed operations, the process which comprises mixing a fine-grained clay with water and with a soluble sodium silicate having a percentage ratio of $SiO_2$ to $Na_2O$ ranging from about 2.5:1 to 4:1 and so selecting the relative proportions and compositions of the ingredients as to produce an aqueous phase having a viscosity and gravity falling on the low-viscosity portion of the knee of its viscosity-gravity curve and a finished adhesive containing not substantially more than about 20 per cent by weight of clay, with a viscosity ranging from about 50 to 500 centipoises, sufficient clay being added to produce a filter test not substantially exceeding 15 cc.; the gravity of said aqueous phase being within the range of 30° to 48° Bé., the gravity and the ratio of $SiO_2$ to $NaO_2$ being so correlated that the higher gravities occur with the lower ratios, substantially as described.

2. In the manufacture of adhesives particularly adapted for use in the high-speed continuous machine fabrication of laminated paper products, the process which comprises preparing a deflocculated clay slip by mixing a fine grained clay with water and with a peptizing agent, then adding sodium silicate, having a percentage ratio of $SiO_2$ to $Na_2O$ ranging from about 2.5:1 to 4:1, the proportions of clay and silicate employed being such as to produce a finished adhesive having a clay content not exceeding about 20 per cent by weight, having a viscosity ranging from about 50 to 500 centipoises, having a filter test ranging from about 4 to 15 cc. and with an aqueous phase having a viscosity and gravity falling on the low-viscosity portion of the knee of its viscosity-gravity curve substantially as shown and described.

3. The process of claim 7 wherein the peptizing agent is an organic peptizing agent.

4. The process of claim 2 wherein the sodium silicate is added in the form of a finely-divided solid, sufficient water being present to dissolve the silicate to the desired concentration.

5. In the manufacture of adhesives particularly adapted for use in the continuous machine fabrication of laminated paper products, the process which comprises mixing together water, a fine-grained clay and a solid, finely divided, water-soluble sodium silicate having a percentage ratio of $SiO_2$ to $Na_2O$ ranging from about 2.5:1 to 4:1 dissolving said silicate in said mixture slowly and in such manner that concentrations within the range of 0.1 to 5 per cent by weight are obtained for a time sufficient to produce deflocculation of said clay, then dissolving sufficient additional silicate in the mixture to produce an aqueous phase having a viscosity and gravity falling on the low-viscosity portion of the knee of its viscosity-gravity curve, the clay present not substantially exceeding 20 per cent by weight based on the mixture but being sufficient to produce a filter test in the resulting mixture not exceeding 15 cc. and a viscosity ranging from about 50 to 500 centipoises substantially as shown and described.

6. In the manufacture of adhesives particularly adapted for use in the continuous machine fabrication of laminated paper products, the process which comprises mixing a fine-grained kaolin-type clay with a solution of sodium silicate having a concentration ranging from about 0.1 to 5 per cent by weight to deflocculate said clay, then adding a solid, finely-divided, water-soluble sodium silicate having a percentage ratio of $SiO_2$ to $Na_2O$ ranging from about 2.5:1 to 4:1 and dissolving said solid silicate in the solution until the aqueous phase has a viscosity falling on the low-viscosity portion of the knee of its viscosity-gravity curve, the clay employed being not substantially more than about 20 per cent by weight of the mixture and being sufficient to produce a filter test not exceeding 15 cc. and a viscosity ranging from about 50 to 500 centipoises substantially as shown and described.

7. In the manufacture of adhesives particularly adapted for use in the continuous machine fabrication of laminated paper products, the process which comprises preparing a deflocculated clay slip by mixing a finely divided China clay with water and with a peptizing agent, then adding sodium silicate, having a percentage ratio of $SiO_2$ to $Na_2O$ ranging from about 3.2:1 to 3.4:1, in amount sufficient to produce an aqueous phase having a gravity ranging from about 37° to 41° Bé., the quantity of clay present ranging from about 6 to 12 per cent by weight and being of a type producing a filter test ranging from about 4 to 12 cc., the viscosity of the resulting adhesive ranging from about 50 to 500 centipoises substantially as shown and described.

8. A quick-setting adhesive particularly adapted for use in high-speed operations, which comprises a substantially stable suspension of a highly dispersed clay in an aqueous phase comprising a solution of an alkali metal silicate having a ratio of $SiO_2$ to alkali metal oxide within the range of 2.5:1 to 4:1, said aqueous phase having a viscosity and gravity falling on the low-viscosity portion of the knee of its viscosity-gravity curve, said adhesive containing not substantially more than 20 per cent of clay, having a filter test ranging from about 4 to 15 cc. and a viscosity ranging from about 50 to 500 centipoises substantially as shown and described.

9. The adhesive of claim 8 in which the alkali metal silicate is sodium silicate and wherein the viscosity of the aqueous phase lies between about 25 and 150 centipoises.

10. The adhesive of claim 8 in which the aqueous phase contains the residues of a deflocculating agent.

11. A quick-setting adhesive particularly adapted for high-speed operations which comprises a substantially stable suspension of a highly-dispersed clay in an aqueous phase containing dissolved therein the more reactive portions of said clay, said aqueous phase comprising an alkali metal silicate solution having a viscosity and gravity falling on the low-viscosity portion of the knee of its viscosity-gravity curve, the said adhesive containing not substantially more than 20 per cent of clay, having a viscosity lying between about 50 to 500 centipoises and a filter test not substantially exceeding 15 cc. and being substantially insensitive to variations in temperature substantially as shown and described.

12. An adhesive particularly adapted for use in the continuous machine fabrication of laminated paper products, which comprises a stable suspension of a highly-dispersed China clay in an aqueous medium comprising sodium silicate in solution, having a percentage ratio of $SiO_2$ to $Na_2O$ ranging from about 3.2:1 to 3.4:1 and a gravity ranging from about 37° to 41° Bé., the adhesive containing not substantially more than 20 per cent of clay, having a filter test ranging from about 4 to 12 cc. and a viscosity ranging from about 50 to 500 centipoises substantially as shown and described.

13. An adhesive particularly adapted for use in the continuous machine fabrication of laminated paper products, which comprises a stable suspension of a highly-dispersed China clay in an aqueous medium comprising a solution of sodium silicate having a percentage ratio of $SiO_2$ to $Na_2O$ ranging from about 3.2:1 to 3.4:1 and a viscosity and gravity falling on the low-viscosity portion of the knee of its viscosity-gravity curve, the amount of clay in said adhesive not substantially exceeding 20 per cent by weight, said adhesive having a filter test ranging from about 4 to 12 cc. and having a viscosity ranging from about 50 to 500 centipoises substantially as shown and described.

14. In the manufacture of quick-setting adhesives particularly adapted for high-speed operations, the process which comprises mixing a fine-grained clay with water and with a soluble sodium silicate, having a percentage ratio of $SiO_2$ to $Na_2O$ within the range of 2.5 to 4.0, and so selecting the relative proportions and the compositions of the ingredients as to produce a finished adhesive having a viscosity ranging from about 50 to 500 centipoises, the clay present in the finished adhesive amounting to not substantially more than about 20 per cent by weight but sufficient clay being added to produce a filter test not substantially exceeding 15 cc.; the gravity of the aqueous phase of said adhesive being within the range of 30° to 48° Bé., the gravity and the ratio of $SiO_2$ to $Na_2O$ in the aqueous phase being so correlated that the higher gravities occur with the lower ratios, substantially as described.

15. In the manufacture of quick-setting adhesives particularly adapted for high-speed operation, the process which comprises preparing a deflocculated clay slip, mixing said slip with water and with a soluble sodium silicate having a percentage ratio of $SiO_2$ to $Na_2O$ ranging from about 2.5:1 to 4:1, the clay present in the finished adhesive amounting to not substantially more than about 20 per cent by weight but sufficient clay being added to produce a finished adhesive having a viscosity ranging from about 50 to 500 centipoises and a filter test not substantially exceeding 15 cc.; the gravity of the aqueous phase of said adhesive being within the range of 30° to 48° Bé., the gravity and the ratio of $SiO_2$ to $Na_2O$ in the aqueous phase being so correlated that the higher gravities occur with the lower ratios, substantially as described.

JAMES G. VAIL.
CHESTER LEON BAKER.

CERTIFICATE OF CORRECTION.

Patent No. 2,239,358. April 22, 1941.

JAMES G. VAIL, ET AL.

It is hereby certified that error appears in the printed specification of the above numbered patent requiring correction as follows: Page 1, first column, line 51, for the patent number "2,133,579" read --2,133,759--; page 2, second column, line 36, for "voscosities" read --viscosities--; page 5, first column, line 55, for "finisher" read --finished--; same page, second column, line 34, for "SoO$_2$" read --SiO$_2$--; line 39, for "intimated" read --intimately--; page 6, first column, line 66-67, claim 1, for "occure" read --occur--; same page, second column, line 12, claim 3, for the claim reference numeral "7" read --2--; line 18-19, claim 5, for "particulary" read --particularly--; line 26, same claim, for "n" read --in--; line 50, claim 6, after "viscosity" insert the words --and gravity--; and that the said Letters Patent should be read with this correction therein that the same may conform to the record of the case in the Patent Office.

Signed and sealed this 10th day of June, A. D. 1941.

(Seal)

Henry Van Arsdale,
Acting Commissioner of Patents.